US011645686B2

(12) United States Patent
Le et al.

(10) Patent No.: US 11,645,686 B2
(45) Date of Patent: May 9, 2023

(54) GRAPHICAL APPROACH TO MULTI-MATCHING (71) Applicant: SAP SE, Walldorf (DE)

(72) Inventors: Truc Viet Le, Singapore (SG); Sean Saito, Singapore (SG); Chaitanya Krishna Joshi, Singapore (SG); Rajalingappaa Shanmugamani, Singapore (SG)

(73) Assignee: SAP SE, Walldorf (DE)

( * ) Notice: Subject to any disclaimer, the term of this patent is extended or adjusted under 35 U.S.C. 154(b) by 1135 days.

(21) Appl. No.: 16/210,070

(22) Filed: Dec. 5, 2018

(65) Prior Publication Data
US 2020/0184281 A1 Jun. 11, 2020

(51) Int. Cl.
G06Q 30/04 (2012.01)
G06N 20/00 (2019.01)
G06F 18/2411 (2023.01)
G06F 18/22 (2023.01)
G06V 30/418 (2022.01)

(52) U.S. Cl.
CPC ............ G06Q 30/04 (2013.01); G06F 18/22 (2023.01); G06F 18/2411 (2023.01); G06N 20/00 (2019.01); G06V 30/418 (2022.01)

(58) Field of Classification Search
CPC .... G06K 9/6269; G06K 9/6201; G06N 20/00; G06Q 30/04
USPC .......................................................... 706/12
See application file for complete search history.

(56) References Cited

U.S. PATENT DOCUMENTS

| 7,376,635 | B1 * | 5/2008 | Porcari .................. G06F 16/355 |
| 7,991,680 | B2 | 8/2011 | Livesay et al. |
| 8,229,883 | B2 | 7/2012 | Brauer et al. |
| 8,626,653 | B1 | 1/2014 | Krikorian et al. |
| 8,781,925 | B1 | 7/2014 | Stone et al. |
| 9,129,013 | B2 | 9/2015 | Delaney et al. |
| 9,679,259 | B1 | 6/2017 | Frind et al. |
| 2005/0075960 | A1 | 4/2005 | Leavitt et al. |
| 2009/0138277 | A1 | 5/2009 | Warren et al. |

(Continued)

OTHER PUBLICATIONS

Klamecki, Lawrence. "Using Machine Learning to Solve Data Reconciliation Challenges in Financial Services." Medium, Jun. 12, 2018, medium.com/@lawrenceklamecki/using-machine-learning-to-solve-data-reconciliation-challenges-in-financial-services-b2f1a2dbb954. (Year: 2018).*

(Continued)

Primary Examiner — Stephen S Hong
Assistant Examiner — Broderick C Anderson
(74) Attorney, Agent, or Firm — Fish & Richardson P.C.

(57) ABSTRACT

Methods, systems, and computer-readable storage media for providing, by a machine learning (ML) platform, a first binary classifier, processing, by the first binary classifier a super-set of invoices to provide a plurality of sets of invoices based on matching pairs of invoices in the super-set of invoices, providing, by the ML platform, a second binary classifier, processing, by the second binary classifier, a bank statement and the plurality of sets of invoices to define two or more super-invoices based on aggregate features of invoices in the plurality of sets of invoices, and match the bank statement to a super-invoice of the two or more super-invoices, and outputting a match of the bank statement to the super-invoice.

20 Claims, 7 Drawing Sheets (56) References Cited

U.S. PATENT DOCUMENTS

| | | | |
|---|---|---|---|
| 2011/0246262 A1 | 10/2011 | Pepper et al. | |
| 2013/0085910 A1* | 4/2013 | Chew | G06Q 40/02 |
| | | | 705/30 |
| 2013/0317940 A1 | 11/2013 | Fitz | |
| 2014/0032427 A1 | 1/2014 | Gannon | |
| 2014/0207717 A1 | 7/2014 | Schmidtler et al. | |
| 2016/0246901 A1* | 8/2016 | Kashyap | G06F 16/9024 |
| 2016/0306873 A1 | 10/2016 | Wang et al. | |
| 2017/0103455 A1 | 4/2017 | Schroeder et al. | |
| 2017/0293951 A1 | 10/2017 | Nolan et al. | |
| 2018/0144314 A1 | 5/2018 | Miller | |
| 2018/0218438 A1 | 8/2018 | Schroeder et al. | |
| 2018/0349776 A1* | 12/2018 | Raamadhurai | G06K 9/6219 |
| 2020/0012980 A1* | 1/2020 | Li | G06N 5/025 |

OTHER PUBLICATIONS

U.S. Appl. No. 16/208,681, Saito et al., filed Dec. 4, 2018.

* cited by examiner

GRAPHICAL APPROACH TO MULTI-MATCHING

BACKGROUND

In general, machine learning includes training a machine learning (ML) model that receives input and provides some output. Machine learning can be used in a variety of problem spaces. An example problem space includes matching items of one entity to items of another entity. Examples include, without limitation, matching questions to answers, people to products, and bank statements to invoices. In many situations, it is required to match an item from one entity to a set of items from another. For example, it is possible for a customer to clear multiple invoices with a single payment, which can be referred to as a multi-match (many-to-one), as opposed to a single-match (one-to-one), where one invoice is cleared by a single payment. In many domains, existing approaches involve using a set of heuristics to group entities that are matched to a single entity. However, maintaining a set of heuristics can be unscalable when, for example, the patterns for matching items are numerous and variable.

SUMMARY

Implementations of the present disclosure are directed to matching single electronic documents to sets of electronic documents. More particularly, implementations of the present disclosure are directed to a machine learning (ML) platform for matching a bank statement to a set of invoices.

In some implementations, actions include providing, by a machine learning (ML) platform, a first binary classifier, processing, by the first binary classifier a super-set of invoices to provide a plurality of sets of invoices based on matching pairs of invoices in the super-set of invoices, providing, by the ML platform, a second binary classifier, processing, by the second binary classifier, a bank statement and the plurality of sets of invoices to define two or more super-invoices based on aggregate features of invoices in the plurality of sets of invoices, and match the bank statement to a super-invoice of the two or more super-invoices, and outputting a match of the bank statement to the super-invoice. Other implementations of this aspect include corresponding systems, apparatus, and computer programs, configured to perform the actions of the methods, encoded on computer storage devices.

These and other implementations can each optionally include one or more of the following features: the first classifier is trained using training data including positive examples including vectors of features associated with a first class label, and negative examples including vectors of features associated with a second class label; the vectors of features are provided using pairwise comparison of matching invoices in the training data using respective operators based on feature type; the vectors of features are provided using pairwise comparison of randomly selected non-matching invoices in the training data using respective operators based on feature type; the second classifier is trained using training data including positive examples including aggregated features of a set of invoices that are matched to a subject bank statement, and negative examples including aggregated features of a perturbed set of invoices provided based on the set of invoices; each super-invoice is provided based on a graph including a plurality of nodes representing invoices, and edges between pairs of nodes that are determined to match; the first binary classifier, and the second binary classifier each includes one of a support vector machine (SVM), a decision tree, and a deep learning model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to matching single electronic documents to sets of electronic documents. More particularly, implementations of the present disclosure are directed to a machine learning (ML) platform for matching a bank statement to a set of invoices. Implementations can include actions of providing, by a machine learning (ML) platform, a first binary classifier, processing, by the first binary classifier a super-set of invoices to provide a plurality of sets of invoices based on matching pairs of invoices in the super-set of invoices, providing, by the ML platform, a second binary classifier, processing, by the second binary classifier, a bank statement and the plurality of sets of invoices to define two or more super-invoices based on aggregate features of invoices in the plurality of sets of invoices, and match the bank statement to a super-invoice of the two or more super-invoices, and outputting a match of the bank statement to the super-invoice.

Implementations of the present disclosure are described in further detail with reference to an example problem space that includes matching a bank statement to a set of invoices. More particularly, implementations of the present disclosure are described with reference to the problem of, given one bank statement, determining a set of invoices that the bank statement matches to. It is contemplated, however, that implementations of the present disclosure can be realized in any appropriate problem space.

To provide further context for implementations of the present disclosure, and as introduced above, one of the main tasks of the cash application process is to match bank statements (BSs), which record received incoming payments, with the correct set of open receivables (ORs), also referred to as open invoices issued by an enterprise to its customers. This process typically involves applying the incoming BS to the correct customer account (also referred to as customer identification), and then to the correct invoice(s) issued to that customer. A single-match problem arises when a BS is to be matched to exactly one correct invoice issued to the customer. However, it often occurs that a customer makes a single payment for a set of invoices, which further complicates the cash application process. This is because retrieving the invoices whose sum of amounts match (exactly or as closely as possible) to that of the single BS is an instance of a combinatorially difficult subset sum problem. Because the subset sum problem is NP-complete (i.e., non-deterministic polynomial time (NP) decision problem that belongs to both NP and NP-hard complexity classes), there exists no efficient algorithm that can perform such a matching from one BS to multiple invoices using the amounts only (or a combination of other features). This is referred to as the multi-match problem of cash application. In short, it is the problem of matching one BS to a correct set of related invoices.

Traditional approaches can include a naive brute-force (exhaustive) search based on the invoice amounts, and a combination of other features (e.g., customer names, company codes), such that their sum can match that of the BS. This approach, however, is not scalable as the number of invoices grow. In fact, its complexity grows exponentially. Consequently, any solution based on brute-force search is not practical in most real-world applications.

In view of the above context, implementations of the present disclosure provide a ML platform for multi-matching of bank statements to open receivables (invoices). As described in further detail herein, the ML platform of the present disclosure provides an invoice-invoice matching pipeline based on a first binary classifier, and a bank statement to super-invoice matching pipeline based on a second binary classifier. In training, the pipelines can be trained separately, each relying on the ground truth matching relations only. In inference, the first binary classifier (invoice-invoice matcher) is called first to match all pairs of open receivables (ORs), and form cliques among them. The second binary classifier (bank statement to super-invoice matcher) is called to generate super-invoices (i.e., aggregate features) from the returned set of cliques, and match a bank statement to the correct super-invoice.

Figure 1:
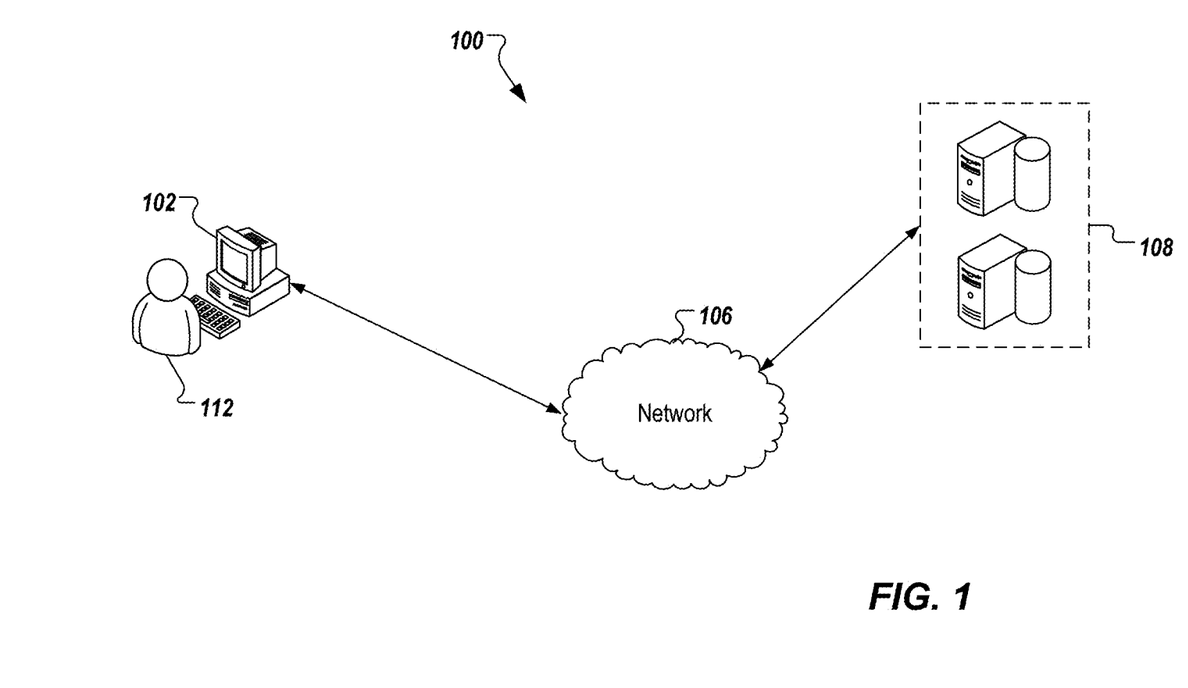
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML platform for matching single bank statements to sets of invoices. More particularly, and as described in further detail herein, the server system 104 can receive electronic documents representative of bank statements, and invoices, and can process the electronic documents to match a single invoice to a set of invoices, referred to herein as a super-invoice.

Figure 2A:
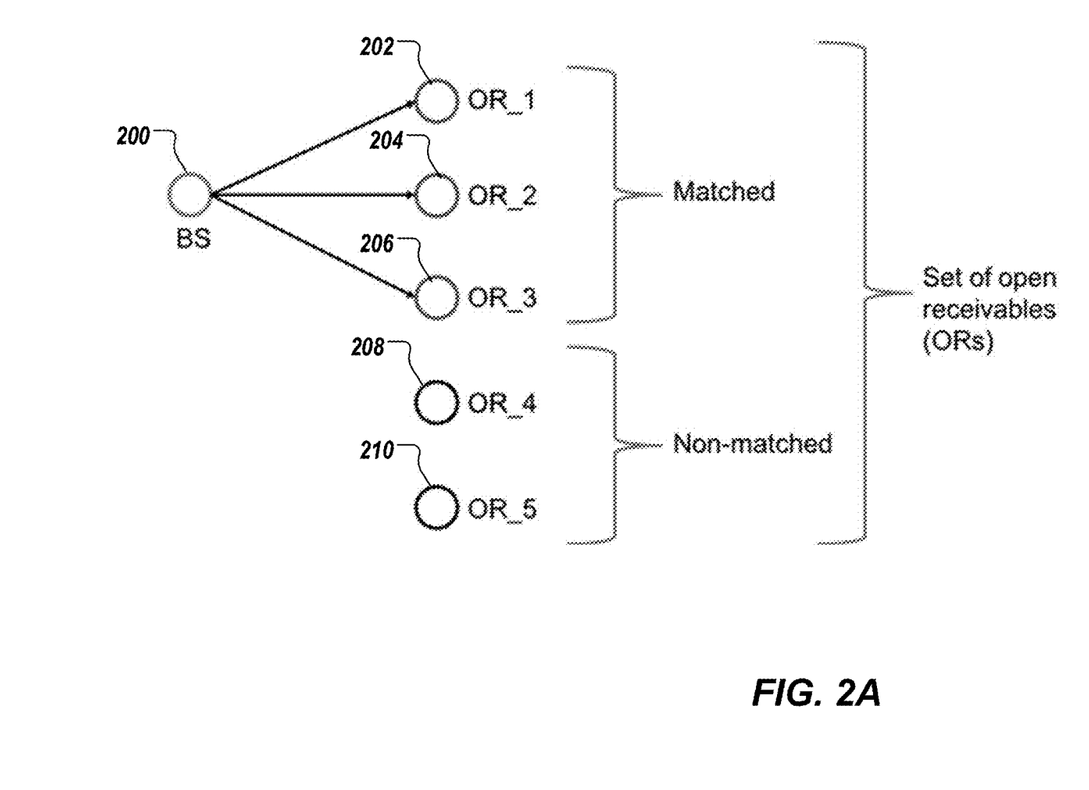
FIG. 2A depicts a graphical representation of an example multi-match problem.

FIG. 2A depicts a graphical representation of an example multi-match problem. In the example of FIG. 2, a node 200 represents a bank statement (BS), nodes 202, 204, 206 represent matched invoices (open receivables (ORs) matched to the BS), and nodes 208, 210 represent non-matched invoices. In FIG. 2, graph-theoretic notations are used to denote five invoices (OR's) under consideration, and a bank statement (BS) as nodes and the matching relations (from BS to OR_1, OR_2, and OR_3) as directed edges. The invoices OR_4 and OR_5 are not matched to the BS. Consequently, there are no edges between each of OR_4 and OR_5, and the BS.

To achieve such multi-matching, implementations of the present disclosure provide a scalable solution that is based on concepts and techniques in graph theory and machine learning. In accordance with implementations of the present disclosure, a graph-theoretic assumption is made that any pair of invoice nodes that are matched to a bank statement are matched to each other (e.g., through the commonly matched bank statement). Consequently, the subset of invoices that are matched to a common bank statement are pairwise matched to each other, and form a complete subgraph, also referred to as a clique. Invoices that are not matched to any bank statement remain unmatched nodes and have degree 0 (also referred to as singletons).

In further detail, m represents the number of invoices in a matched clique. Ignoring the edges connecting the invoices to the bank statement, the degree of each invoice in the clique is m−1, because each node is matched to each of the other invoices (through the common bank statement). Therefore, considering undirected edges only (i.e., the invoice pairwise matching relation is symmetric), the total number of edges in the clique is:

$$\frac{m(m-1)}{2} \quad (1)$$

Figure 2B:
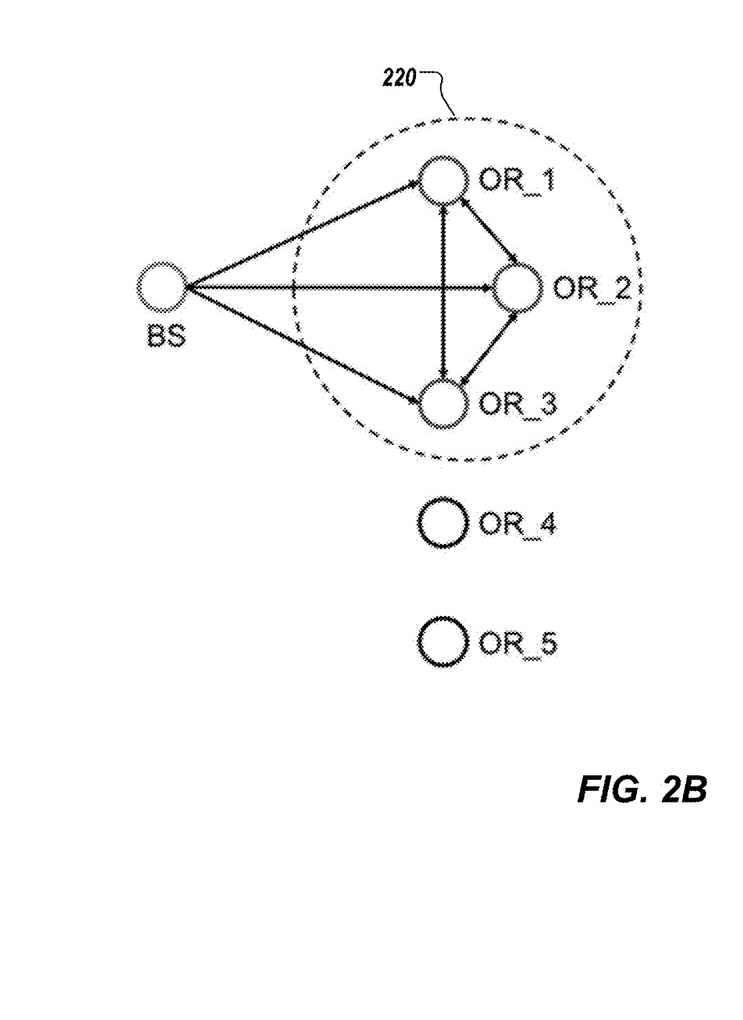
FIG. 2B depicts a graphical representation including a clique based on matches and singletons in accordance with implementations of the present disclosure.

FIG. 2B depicts a graphical representation including a clique 220 based on matches and singletons in accordance with implementations of the present disclosure. The clique 220 is formed through the matched bank statement and excludes singletons (unmatched ORs). In the example of FIG. 3, where there are three ORs (invoices) matched to a bank statement (BS), the degree of each invoice node is two, and the total number of edges in the clique is:

$$\frac{3(3-1)}{2} = 3$$

Invoices OR_4 and OR_5 are not matched to the bank statement and each has degree 0.

In accordance with implementations of the present disclosure, machine learning and the real-world observations that matched invoices often share similar features (customer name, organization, country, city, currency) are leveraged. More particularly, machine learning can be used to train a binary classifier and predict whether a pair of invoices are matched to each other. In particular, the following observations have been made on matched pairs of invoices:

- Matched invoices often have the same company code, currency, country key, customer (debtor), organization, and city name;
- Matched invoices often have similar accounting document number and payment/document reference in terms of string edit distance;
- Matched invoices often have dates (posting/due date) that are the same or not too far apart; and
- Matched invoices often have similar amounts (in the same currency) that are not drastically different from each other.

Based on such observations, pairwise comparisons between equivalent pairs of features of the pair of invoices in question can be used. Such comparisons form the basis of the features used to train the binary classifier that determines whether a pair of invoices are matched. In some implementations, the binary classifier can be any appropriate binary classifier. Example binary classifiers include, without limitation to, support vector machine (SVM), (boosted) decision trees, and deep learning models. To completely solve the multi-match problem, cliques of invoices are formed from the set of open receivables using the binary classifier, and the bank statement in question is to be matched to the correct clique of invoices. This is referred to herein as bank statement to super-invoice matching.

In view of the above, implementations of the present disclosure provide a ML platform for multi-matching of bank statements to open receivables. As described in further detail herein, the ML platform of the present disclosure include multiple ML pipelines that work together. A first ML pipeline includes an invoice-invoice matching pipeline to form a set of cliques, also referred to herein as super-invoices. That is, the invoice-invoice matching pipeline performs matching on the set of open receivables, and forms cliques among matching pairs. A second ML pipeline includes a bank statement to super-invoice matching pipeline to match a bank statement to a clique of the set of cliques.

In some implementations, the invoice-invoice matching pipeline is trained on a set of training data that includes banks statements, and invoices matched to the bank statements. In some examples, for each bank statement in the training set, $m \geq 1$ is the number of invoices matched to the bank statement. Pairs of invoices (i.e., there are $$\frac{m(m-1)}{2}$$

pairs of them) are defined, to provide the edges in the clique. For each pair of invoices, pairwise feature comparisons are performed based on a list of pre-defined features, and atomic comparison operators. Table 1, below, provides example operators and example features:

TABLE 1

Example Atomic Feature Comparators to Pre-defined Set of Features.

| Comparators | Features |
| --- | --- |
| SAME | Company code, currency, city name, country key, document type/item, customer name, fiscal year. |
| EDIT DISTANCE | Document number, assignment number, payment reference |
| AMOUNT DIFFERENCE | Amount in document/local currency |
| DATE DIFFERENCE | Posting date, due date |

Table 1, above, depicts example atomic pairwise feature comparison operators, and example invoice features. Examples of comparison operators (also called comparators) include SAME (tests whether the two features are the same), EDIT DISTANCE (computes the string edit distance between two string features), AMOUNT DIFFERENCE (computes the absolute difference between two numeric features), and DATE DIFFERENCE (computes the date difference between two datetime features).

Pairwise feature comparisons generates vectors (rows) of features, where each comparison forms a feature (column). The number of rows is $$\frac{m(m-1)}{2}.$$

In some examples, a class label to indicate matching (e.g., class label=1 to indicate matching) is assigned to each of the rows. The rows are the positive examples used to train the binary classifier.

In some examples, k can be a pre-determined, positive integer, where k is the number of negative examples used to train the binary classifier. In some examples, m×k pairs of non-matching invoices are generated, where m is the number of matching invoices. Non-matching invoices can be retrieved randomly from the set of open receivables that are not matched to the bank statement. The pairwise feature comparisons are performed to generate m×k rows of negative examples. In some examples, a class label to indicate non-matching (e.g., class label=0 to indicate non-matching)

is assigned to each of the rows. The rows are the negative examples used to train the binary classifier.

The above-described provisioning of positive samples, and negative samples can be performed for all the bank statements in the training set. The positive samples, and negative samples, are used to train the invoice-invoice binary classifier using supervised learning.

With regard to inference, given a set of open receivables of size n to a bank statement in question, $$\frac{n(n-1)}{2}$$

pairs or invoices are provided. Given a trained binary classifier, the probability (p) of each of the pairs being matched to each other is computed (e.g., the probability $p_{ij}$ for invoice pair (i,j)). In some examples, θ is a pre-defined probability threshold (e.g., 0≤θ≤1). In some examples, G is a graph having n nodes representing then invoices. For each pair of invoices (i,j), the pair of invoices (i,j) is added to a set of edges E of G, if $p_{ij}$≥0. From the graph G, and the edges E, all cliques in the graph G are provided. In some examples, identifying cliques in a graph can be achieved using maximum clique, weighted maximum clique, maximal clique listing, k-clique, and clique decision. It is contemplated, however, that any appropriate means for identifying cliques in a graph can be used.

With regard to the bank statement to super-invoice matching pipeline, a training phase and an inference phase are also provided. In training, for each bank statement, a set of matched invoices is retrieved. In some examples, the aggregate features of the set of matched invoices (e.g., distribution of the amounts, amount difference between the invoice total and the bank statement amount, degree distribution of nodes in the clique) is determined. For example, a list of aggregate features that are to be calculated is defined. A positive example is determined based on the aggregate features. In some examples, k>0 is a pre-defined number of negative examples that are generated by randomly perturbing the set of matched invoices. That is, matching invoices can be randomly removed from the set, and/or non-matching invoices can be added to the set. In this manner, perturbed sets of invoices can be provided. In some examples, the aggregate features of each perturbed set of invoices are determined.

Given the generated positive and negative examples, a binary classifier is trained. The binary classifier matches a given bank statement to a super-invoice (set of invoices), whose features are the aggregate features of the invoices in the clique. In some examples, the binary classifier is trained using supervised trained. It is contemplated that any appropriate supervised training can be used to train the binary classifier.

With regard to inference, given a set of cliques returned from the invoice-invoice matching pipeline, described above, sets of super-invoices are provided from the cliques. In some examples, the trained super-invoice classifier, is used to predict the best-matching clique (i.e., super-invoice) to the bank statement in question. Metrics (e.g., intersection over union (IoU)) can be used to evaluate how well the combined pipeline (invoice-invoice and bank statement to super-invoice matching) performs.

Figure 3:
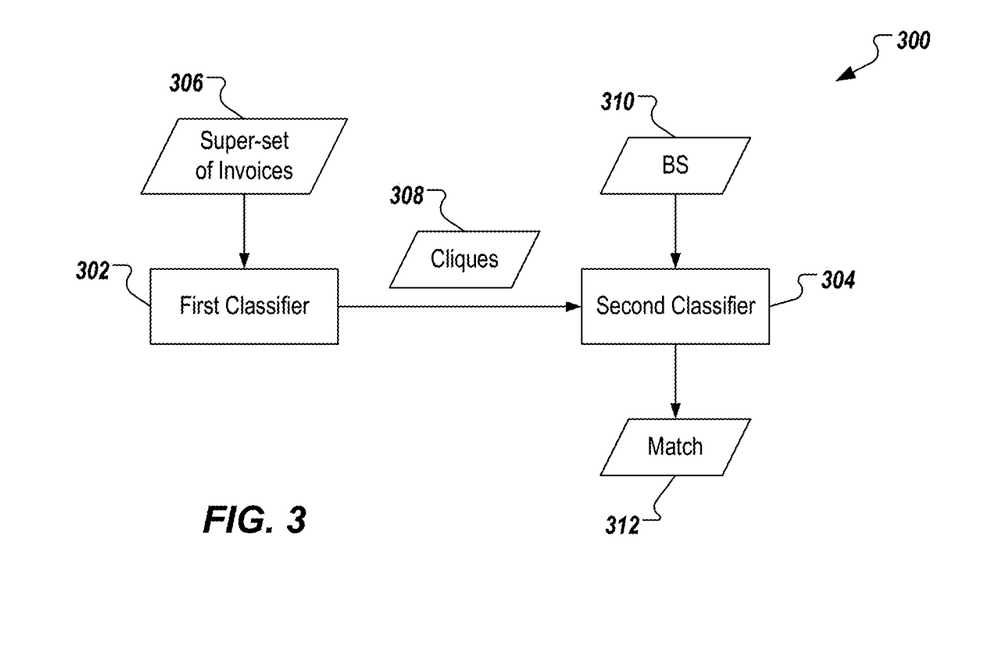
FIG. 3 depicts an example conceptual architecture in accordance with implementations of the present disclosure.

FIG. 3 depicts an example conceptual architecture 300 in accordance with implementations of the present disclosure. The example conceptual architecture 300 includes a first classifier 302, and a second classifier 304. As described above, the first classifier 302 is provided as part of an invoice-invoice matching pipeline that conducts pairwise matching of invoices in a super-set of invoices 306 to provide cliques 308. As also described above, the second classifier 304 is provided as part of a bank statement to super-invoice matching pipeline that processes the clique 308 to provide super-invoices and matches a bank statement 310 to a super-invoice and providing the match 312 as output.

In some implementations, and as described herein, the first classifier, and the second classifier are trained using a training set. In some examples, the set of training data that includes banks statements, and invoices matched to the bank statements. For each pair of invoices, pairwise feature comparisons are performed based on a list of pre-defined features, and atomic comparison operators, described above.

With regard to training of the first classifier, pairwise feature comparisons generates vectors (rows) of features, where each comparison forms a feature (column), and a class label to indicate matching (e.g., class label=1 to indicate matching) is assigned to each of the rows. The rows are the positive examples used to train the first classifier. In some examples, and as described above, non-matching invoices can be retrieved randomly from the set of open receivables that are not matched to the bank statement. The pairwise feature comparisons are performed to generate rows of negative examples, and a class label to indicate non-matching (e.g., class label=0 to indicate non-matching) is assigned to each of the rows. The rows are the negative examples used to train the first classifier.

With regard to training of the second classifier, for each bank statement, a set of matched invoices is retrieved. In some examples, the aggregate features of the set of matched invoices (e.g., distribution of the amounts, amount difference between the invoice total and the bank statement amount, degree distribution of nodes in the clique) is determined. For example, a list of aggregate features that are to be calculated is defined. A positive example is determined based on the aggregate features. In some examples, negative examples are generated by randomly perturbing the set of matched invoices. That is, matching invoices can be randomly removed from the set, and/or non-matching invoices can be added to the set.

Figure 4:
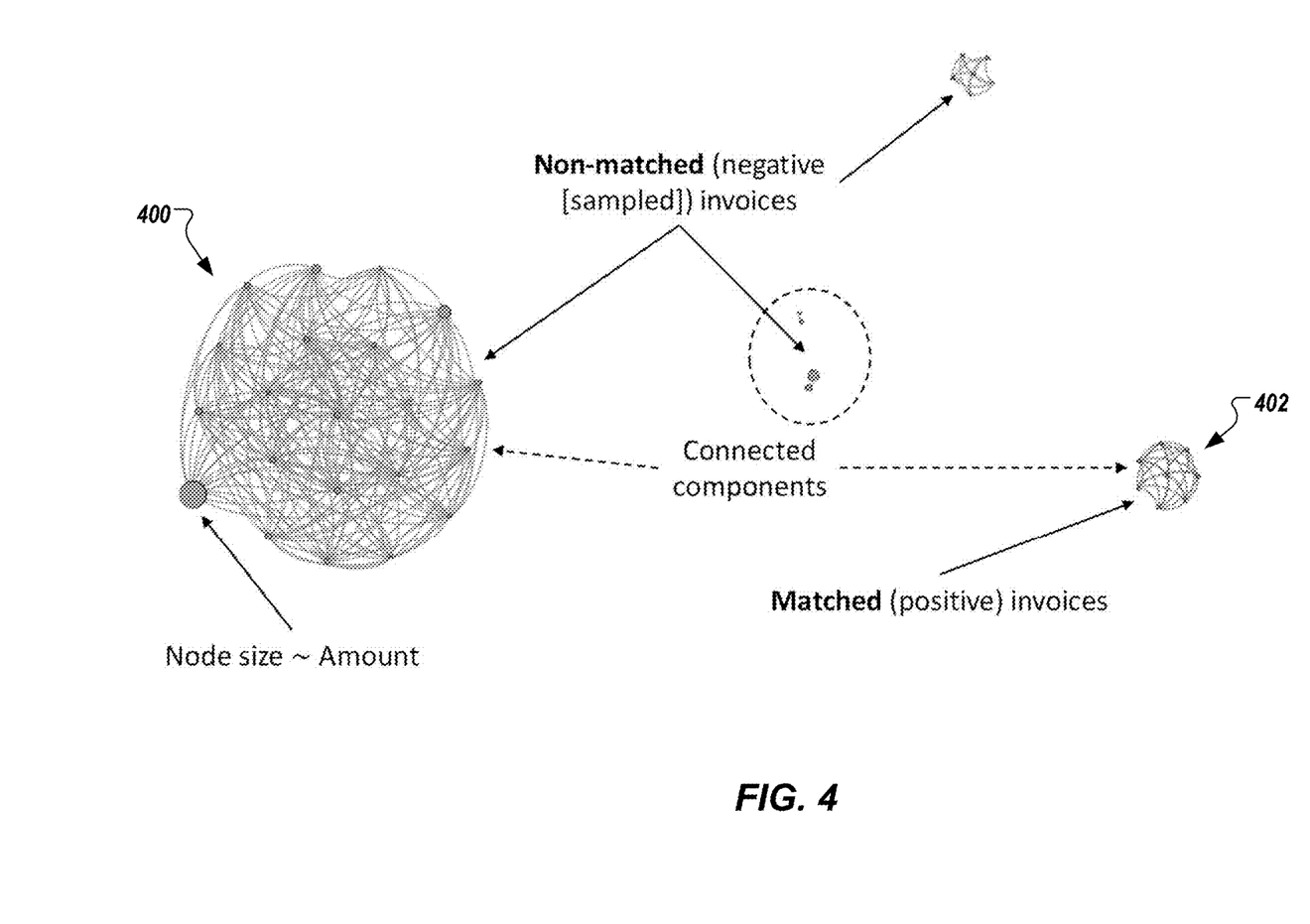
FIG. 4 depicts an example representation of cliques provided for a set of open receivables in accordance with implementations of the present disclosure.

FIG. 4 depicts an example representation of cliques provided for a set of open receivables in accordance with implementations of the present disclosure. In the example of FIG. 4, a clique 400 depicts a set of matching pairs of invoices that do not match to a bank statement in question, and a clique 402 depicts a set of matching pairs of invoices that do match to the bank statement in question.

Figure 5:
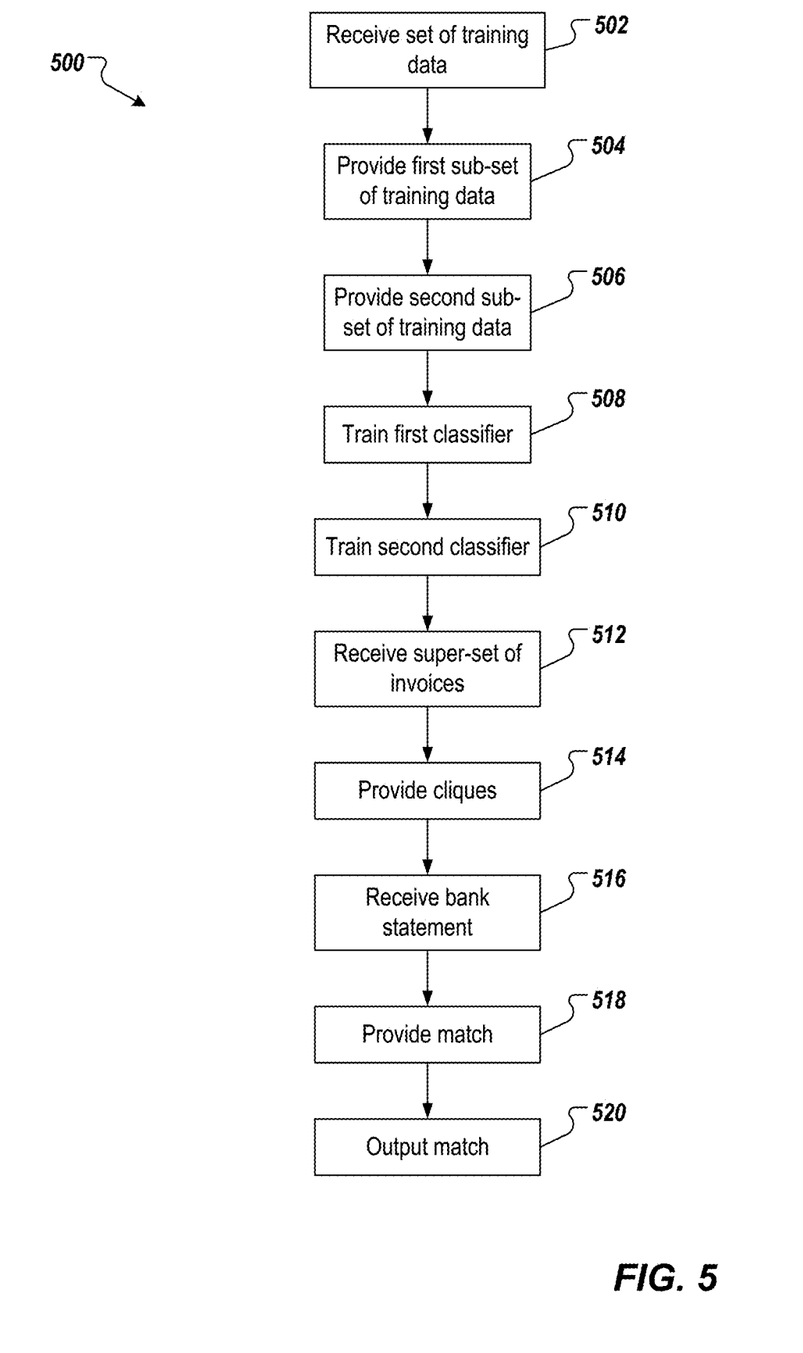
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A set of training data is received (502). For example, a set of training data that includes banks statements, and invoices matched to the bank statements is provided. A first sub-set of training data is provided (504). For example, and as described herein, the set of training data is processed using pairwise feature comparison of matching invoices to provide positive training examples, and negative training examples. A second sub-set of training data is provided (506). For example, and as described herein, the set of training data is processed to provide aggregate features of the set of matched invoices within the training data, and perturbed sets of matched invoices to provide positive training examples, and negative training examples. A first classifier is trained using the first sub-set of training data (508). A second classifier is trained using the second sub-set of training data (510).

A super-set of invoices is received (512). For example, the super-set of invoices can include invoices that are to be matched to a bank statement (e.g., provided in a set of bank statements). The super-set of invoices is processed using the first classifier to provide cliques (514). For example, and as described herein, pairwise matching of invoices is performed using the first classifier to provide cliques. A bank statement is received (516). The bank statement and the cliques are processed using the second classifier to provide a match (518). For example, and as described herein, the cliques are processed by the second classifier to provide a set of super-invoices, and the bank statement is matched to a super-invoice in the set of super-invoices. The match is output (520). For example, the match between the bank statement, and the super-invoice can be displayed on a display.

Figure 6:
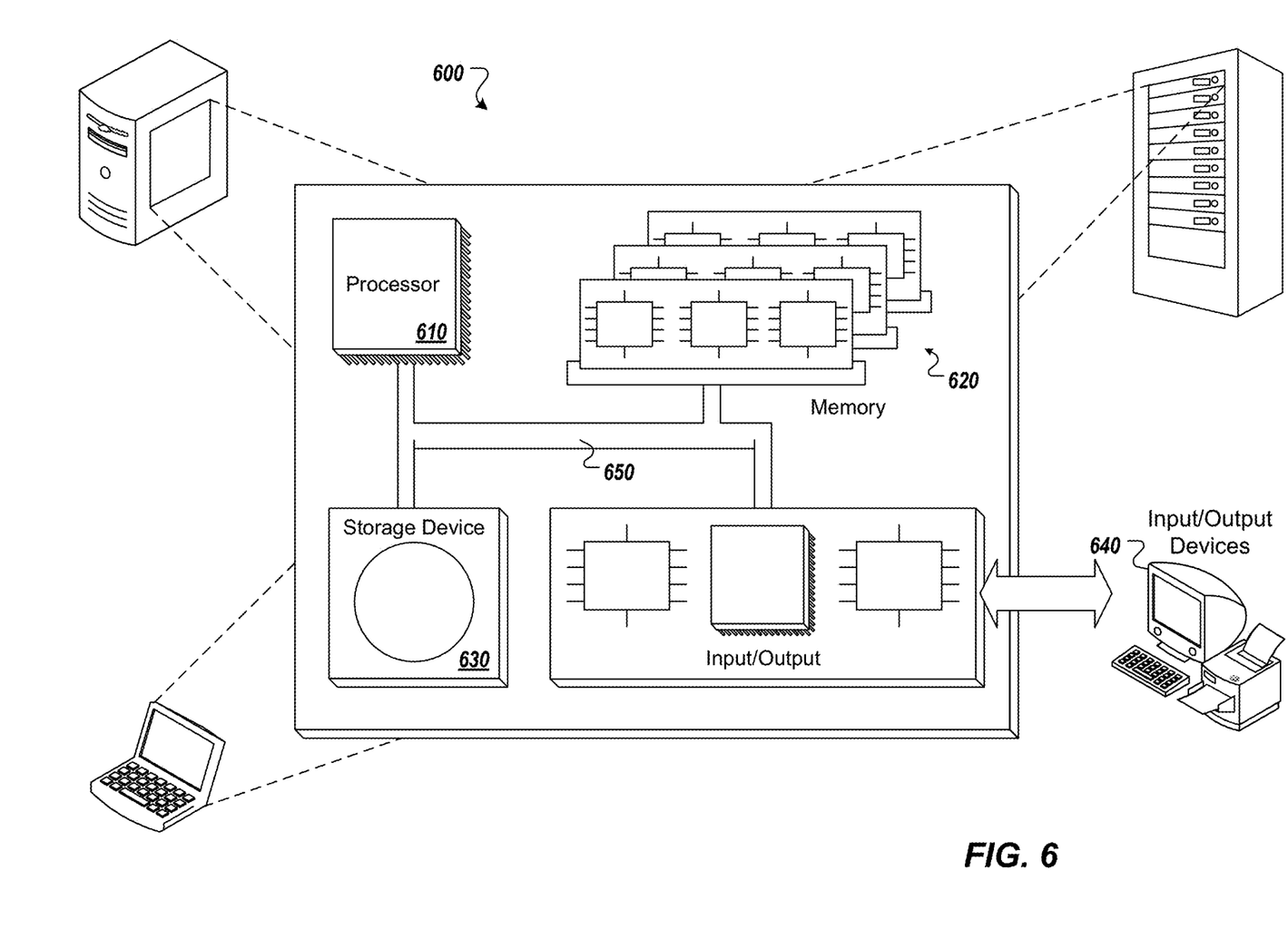
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching a bank statement to a set of invoices, the method being executed by one or more processors and comprising:
providing, by a machine learning (ML) platform, a first binary classifier that is trained to execute invoice to invoice matching, the first binary classifier being trained using training data comprising a training set of bank statements and, for each bank statement, a training set of invoices, wherein within each training set of invoices, one or more pairs of invoices are defined as matching invoices;
processing, by the first binary classifier, a super-set of invoices to selectively match invoices to invoices and provide a plurality of sets of invoices based on matching pairs of invoices in the super-set of invoices;
providing, by the ML platform, a second binary classifier that is trained to execute bank statement to super-invoice matching;
processing, by the second binary classifier, a bank statement and the plurality of sets of invoices to define two or more super-invoices based on aggregate features of invoices in the plurality of sets of invoices, and match the bank statement to a super-invoice of the two or more super-invoices; and
outputting a match of the bank statement to the super-invoice.

2. The method of claim 1, wherein the training data comprises positive examples comprising vectors of features associated with a first class label, and negative examples comprising vectors of features associated with a second class label.

3. The method of claim 2, wherein the vectors of features are provided using pairwise comparison of matching invoices in the training data using respective operators based on feature type.

4. The method of claim 2, wherein the vectors of features are provided using pairwise comparison of randomly selected non-matching invoices in the training data using respective operators based on feature type.

5. The method of claim 1, wherein the second classifier is trained using training data comprising positive examples comprising aggregated features of a set of invoices that are matched to a subject bank statement, and negative examples comprising aggregated features of a perturbed set of invoices provided based on the set of invoices.

6. The method of claim 1, wherein each super-invoice is provided based on a graph comprising a plurality of nodes representing invoices, and edges between pairs of nodes that are determined to match.

7. The method of claim 1, wherein the first binary classifier, and the second binary classifier each comprises one of a support vector machine (SVM), a decision tree, and a deep learning model.

8. A non-transitory computer-readable storage medium coupled to one or more processors and having instructions stored thereon which, when executed by the one or more processors, cause the one or more processors to perform operations for matching a bank statement to a set of invoices, the operations comprising:
providing, by a machine learning (ML) platform, a first binary classifier that is trained to execute invoice to invoice matching, the first binary classifier being trained using training data comprising a training set of bank statements and, for each bank statement, a training set of invoices, wherein within each training set of invoices, one or more pairs of invoices are defined as matching invoices;
processing, by the first binary classifier, a super-set of invoices to selectively match invoices to invoices and provide a plurality of sets of invoices based on matching pairs of invoices in the super-set of invoices;
providing, by the ML platform, a second binary classifier that is trained to execute bank statement to super-invoice matching;
processing, by the second binary classifier, a bank statement and the plurality of sets of invoices to define two or more super-invoices based on aggregate features of invoices in the plurality of sets of invoices, and match the bank statement to a super-invoice of the two or more super-invoices; and
outputting a match of the bank statement to the super-invoice.

9. The computer-readable storage medium of claim 8, wherein the training data comprises positive examples comprising vectors of features associated with a first class label, and negative examples comprising vectors of features associated with a second class label.

10. The computer-readable storage medium of claim 9, wherein the vectors of features are provided using pairwise comparison of matching invoices in the training data using respective operators based on feature type.

11. The computer-readable storage medium of claim 9, wherein the vectors of features are provided using pairwise comparison of randomly selected non-matching invoices in the training data using respective operators based on feature type.

12. The computer-readable storage medium of claim 8, wherein the second classifier is trained using training data comprising positive examples comprising aggregated features of a set of invoices that are matched to a subject bank statement, and negative examples comprising aggregated features of a perturbed set of invoices provided based on the set of invoices.

13. The computer-readable storage medium of claim 8, wherein each super-invoice is provided based on a graph comprising a plurality of nodes representing invoices, and edges between pairs of nodes that are determined to match.

14. The computer-readable storage medium of claim 8, wherein the first binary classifier, and the second binary classifier each comprises one of a support vector machine (SVM), a decision tree, and a deep learning model.

15. A system, comprising:
a computing device; and
a computer-readable storage device coupled to the computing device and having instructions stored thereon which, when executed by the computing device, cause the computing device to perform operations for matching a bank statement to a set of invoices, the operations comprising:
providing, by a machine learning (ML) platform, a first binary classifier that is trained to execute invoice to invoice matching, the first binary classifier being trained using training data comprising a training set of bank statements and, for each bank statement, a training set of invoices, wherein within each training set of invoices, one or more pairs of invoices are defined as matching invoices;
processing, by the first binary classifier, a super-set of invoices to selectively match invoices to invoices and provide a plurality of sets of invoices based on matching pairs of invoices in the super-set of invoices;

providing, by the ML platform, a second binary classifier that is trained to execute bank statement to super-invoice matching;

processing, by the second binary classifier, a bank statement and the plurality of sets of invoices to define two or more super-invoices based on aggregate features of invoices in the plurality of sets of invoices, and match the bank statement to a super-invoice of the two or more super-invoices; and outputting a match of the bank statement to the super-invoice.

16. The system of claim 15, wherein the training data comprises positive examples comprising vectors of features associated with a first class label, and negative examples comprising vectors of features associated with a second class label.

17. The system of claim 16, wherein the vectors of features are provided using pairwise comparison of matching invoices in the training data using respective operators based on feature type.

18. The system of claim 16, wherein the vectors of features are provided using pairwise comparison of randomly selected non-matching invoices in the training data using respective operators based on feature type.

19. The system of claim 15, wherein the second classifier is trained using training data comprising positive examples comprising aggregated features of a set of invoices that are matched to a subject bank statement, and negative examples comprising aggregated features of a perturbed set of invoices provided based on the set of invoices.

20. The system of claim 15, wherein each super-invoice is provided based on a graph comprising a plurality of nodes representing invoices, and edges between pairs of nodes that are determined to match.

* * * * *